United States Patent [19]
Renk

[11] 3,731,554
[45] May 8, 1973

[54] GEARSHIFT ARRANGEMENT FOR A MOTOR VEHICLE CHANGE-SPEED GEAR

[75] Inventor: Rolf Renk, Russelsheim, Main, Germany

[73] Assignee: General Motors Corporation, Detroit, Mich.

[22] Filed: Nov. 24, 1971

[21] Appl. No.: 201,796

[30] Foreign Application Priority Data

Dec. 19, 1970 Germany.....................P 20 62 691.9

[52] U.S. Cl..........................................74/477, 74/475
[51] Int. Cl. ...............................................G05g 9/12
[58] Field of Search...................74/473 R, 475, 476, 74/477

[56] References Cited

UNITED STATES PATENTS 3,264,893  8/1966  Stott et al. ............................74/477
3,550,467  12/1970  Forichen............................74/473 R

*Primary Examiner*—Milton Kaufman
*Attorney*—W. E. Finken et al.

[57] ABSTRACT

A gearshift arrangement for a motor vehicle change-speed gear, primarily for use with a transversely mounted engine, includes a manual gearshift lever articulated to a selector shaft that is mounted for selective longitudinal displacement and rotary movement. Shift forks are effecting movement of slidable shift coupling sleeves or a slidable pinion are formed as angled pivotal shift forks having free lever ends which, during a gearshift, are engaged directly by selector fingers that effectively form part of the selector shaft.

8 Claims, 5 Drawing Figures

GEARSHIFT ARRANGEMENT FOR A MOTOR VEHICLE CHANGE-SPEED GEAR The invention relates to gearshift arrangements for motor vehicle change-speed gears, primarily for motor vehicles having an engine extending transversely to the direction of vehicle travel, with a gearshift lever articulated to a shaft which is mounted so as to be selectively longitudinally displaceable and rotatable, for the purpose of selecting and actuating one of a plurality of gearshift forks.

Such gearshift arrangements, utilized generally in conjunction with a "normal," lengthwise arrangement of the engine, usually involve the use of several longitudinally displaceable shift fork rods, on each of which a shift fork is mounted for selective engagement of two adjacent gear ratios. For actuation of such gearshift arrangements, first of all one of the shift fork rods is selected, whereupon the selected shift fork rod is displaced in a longitudinal direction, to cause an associated shift fork to move a synchronizing clutch (coupling sleeve) or a sliding pinion, for engagement of the desired gear ratio.

In such shift arrangements, the gearshift lever may by articulated by means of a double joint to the shaft (selector shaft) which is mounted so as to be selectively longitudinally displaceable and rotatable. During the selecting operation, a selector finger or similar projection on the shaft is brought into alignment or engagement with a recess in one of the shift fork rods, and then, by longitudinal displacement of the shaft, and consequently of the associated shift fork rod, the desired gear ratio is engaged. In this gearbox operation, the pattern of movement of the gearshift lever (for example a floor-mounted shift lever) is determined by an H-shaped shift gate. The H-shaped gear-change pattern is used in practically all well-known types of automobiles utilizing a manual shift, and will therefore be familiar to all drivers.

With the introduction of transversely mounted engines with the associated gearbox parallel to the engine, it is desirable to be able to retain the proven H-shaped gearshift pattern unchanged, but previous attempts to do this have involved a complicated releasable connection between shift fork rod and selector shaft, because the transverse arrangement of the gearbox made it necessary for the gearshift forces to be turned through an angle of 90°. Further, there may be an undesirable increase in the amount of possible play in the mechanism, and a tendency to engage more than one gear ratio at a time. Additionally, such attempts tend to involve the use of more than one (generally three, for four forward ratios and reverse) of the shift fork rods. For such reasons it tends to be difficult to achieve a precise, light-action and play-free transmission of the gear-changing forces.

The present invention is concerned with the problem of overcoming the above defects in the known gearshift arrangements for gearboxes extending transversely, in other words the problem of achieving a shift arrangement of the kind referred to which will require only few connecting elements from gearshift lever to shift fork and will therefore make possible a direct and easy action in the transmission of the gear-change forces to the shift coupling sleeves in the gearbox. The invention is based on the concept that a satisfactory solution of the problem is obtainable only by abandoning the conventional idea of arranging the shift forks on axially displaceable shift fork rods, and instead utilizing shift forks which are shaped and mounted as angled pivotal forks, and have respective free lever ends which, during the shift, directly engage the shaft that is actuated by the manual gearshift lever.

Thereby, separate shift fork rods become unnecessary, as do costly connecting elements between the selector shaft and the shift forks, since the conversion of the longitudinally directed gear-change effort into an essentially transverse movement is now effected by the angled pivotal shift forks themselves. Accordingly, the present gearshift arrangement is able to operate directly, with an easy action and largely without play, and utilizes only a small number of transmission elements, such that it involves relatively low production costs and allows a very compact gearshift layout.

The present arrangement is not limited in application to gearboxes which extend at right angles to the direction of vehicle travel, but can readily be utilized with gearboxes which extend transversely at any angle to the longitudinal axis of the vehicle, it being merely necessary to adapt the angle of the pivotal shift forks to this angle. For a gearbox arranged at right angles to the direction of vehicle travel, it is considered desirable for the pivotal shift forks to be right-angled and to be pivotally mounted at the vertex of the right angle.

By appropriate choice of the lever arm lengths of the pivotal shift forks, it is also possible to step up or step down the gearshift forces or movements. For the most direct transmission of the gearshift forces, the lever-arm length of the shift fork should be approximately the same as the effective length of the free lever portion co-operating with the selector shaft.

The pivotal shift forks may be actuated by selector fingers which project in a generally radially direction from the end portion of the selector shaft and are selectively engageable with a respective groove in the free lever end of each of the pivotal shift forks. For a change-speed gear with four forward ratios and a reverse, according to the invention, two selector fingers at an angle to one another may be arranged at the end of the shaft, such that one selector finger co-operates with the two pivotal shift forks for first and second, and third and fourth, ratios respectively, whereas the other selector finger serves to engage the pivotal shift fork for the reverse ratio.

With the invention, it is also possible to avoid actuating two shift coupling collars at the same time, without the complication of additional parts, by utilizing selector fingers of a thickness less than the distance between the shift fork control grooves, such that the selector fingers cannot be in engagement with two pivotal shift forks simultaneously.

Furthermore, in order to prevent a shift movement taking place when, during the selection movement, a selector finger has taken up a position between the control grooves of two pivotal shift forks, or in order to prevent selection movement when a gear ratio is already engaged, a locking device may be utilized, for example a gearshift gate which is arranged for example above the rod and is engaged by a pin or similar projection firmly connected to the rod.

For the reverse ratio there may be an additional locking device. For example, for an arrangement in which the selector shaft is actuated by a universally mounted gearshift lever having a peg-shaped extension underneath its universal mounting, the additional locking device for the reverse ratio may comprise a stop that is disposed at the bottom of the bearing housing for the shaft and can only be over-ridden by lifting the gearshift lever.

In order to prevent jump-out of the gears when engaged, the pivotal shift forks may have a snap-in detent catch device having a position for each gear ratio and possibly also a neutral position. Thus the pivotal shift fork for the first and second gear ratios, and the pivotal shift fork for the third and fourth ratios, may each have three snap-in positions, whereas a detent catch device may be used for the reverse ratio which gives only two positions. A catch device which offers the advantages of simplicity and certainty of operation is one in which the pivotal shift forks include a lever extension beyond their pivot axes, with the free end of each extension widened into hammer shape and having detent grooves for yieldable engagement by a spring-urged ball.

In the drawings:

FIG. 5 is a fragmentary section on the line V—V of FIG. 2, in the direction of the arrows.

Figure 1:
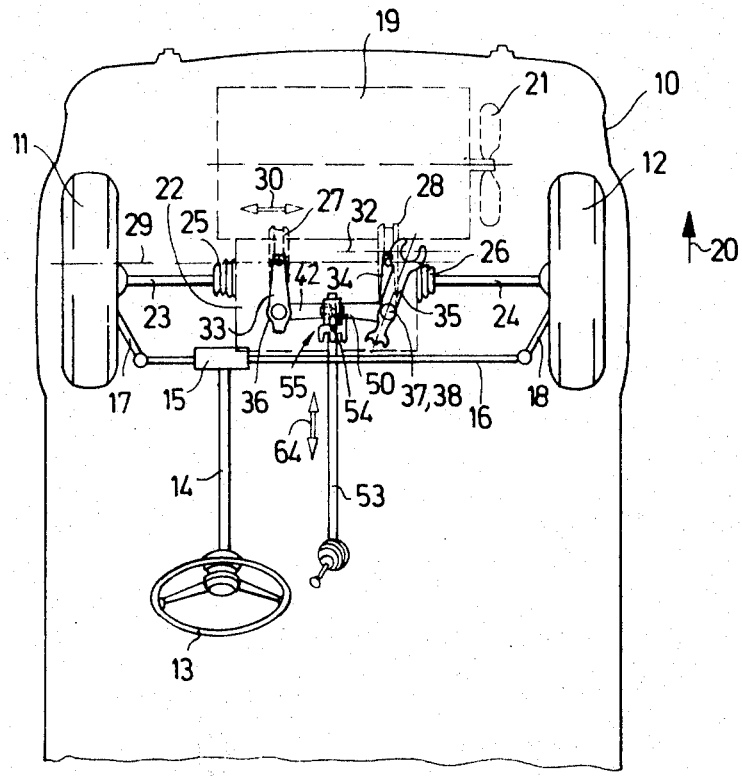
FIG. 1 is a fragmentary schematic plan showing the front portion of a motor vehicle with a transversely mounted engine.

In the general view shown in FIG. 1, the front portion of an automobile 10 is shown as including a pair of front wheels 11 and 12, a steering wheel and steering column 13 and 14, a steering gear 15, a track rod 16, steering arms 17 and 18, an engine 19 mounted transversely to the direction of vehicle travel 20, a cooling fan 21, and a change-speed gearbox 22 arranged parallel to the engine 19, and therefore likewise transversely to the direction of vehicle travel 20. For driving the front wheels, half-shafts 23 and 24 extend from the gearbox 22, with respective rubber sealing gaiters 25 and 26 to exclude dust and moisture and prevent the escape of lubricant.

FIG. 1 also shows two shift coupling sleeves 27 and 28 which form part of a gearshift arrangement and are axially displaceable on the transmission mainshaft 29 in the direction of the arrows 30. Displacement of the coupling sleeves 27 and 28 either actuates a synchronizing clutch or moves a sliding pinion, in a manner known per se, thereby engaging the desired gear ratio, the coupling sleeve 27 serving for engaging the third (right-hand position) and fourth (left-hand position) gear ratios whereas the coupling sleeve 28 effects engagement of the first (left-hand position) and second (right-hand position) ratios. Reverse ratio is engaged by the direct displacement of a pinion 31 (FIG. 4) on a shaft 32 indicated in FIG. 1 as an interrupted line. Pinion 31 has been omitted from FIG. 1 for clarity but will be seen in the enlarged view of FIG. 4, which will be further considered below in greater detail. In the position illustrated in the drawings, the shift coupling sleeves 27 and 28 and the sliding pinion 31 are in the neutral position.

Figure 2:
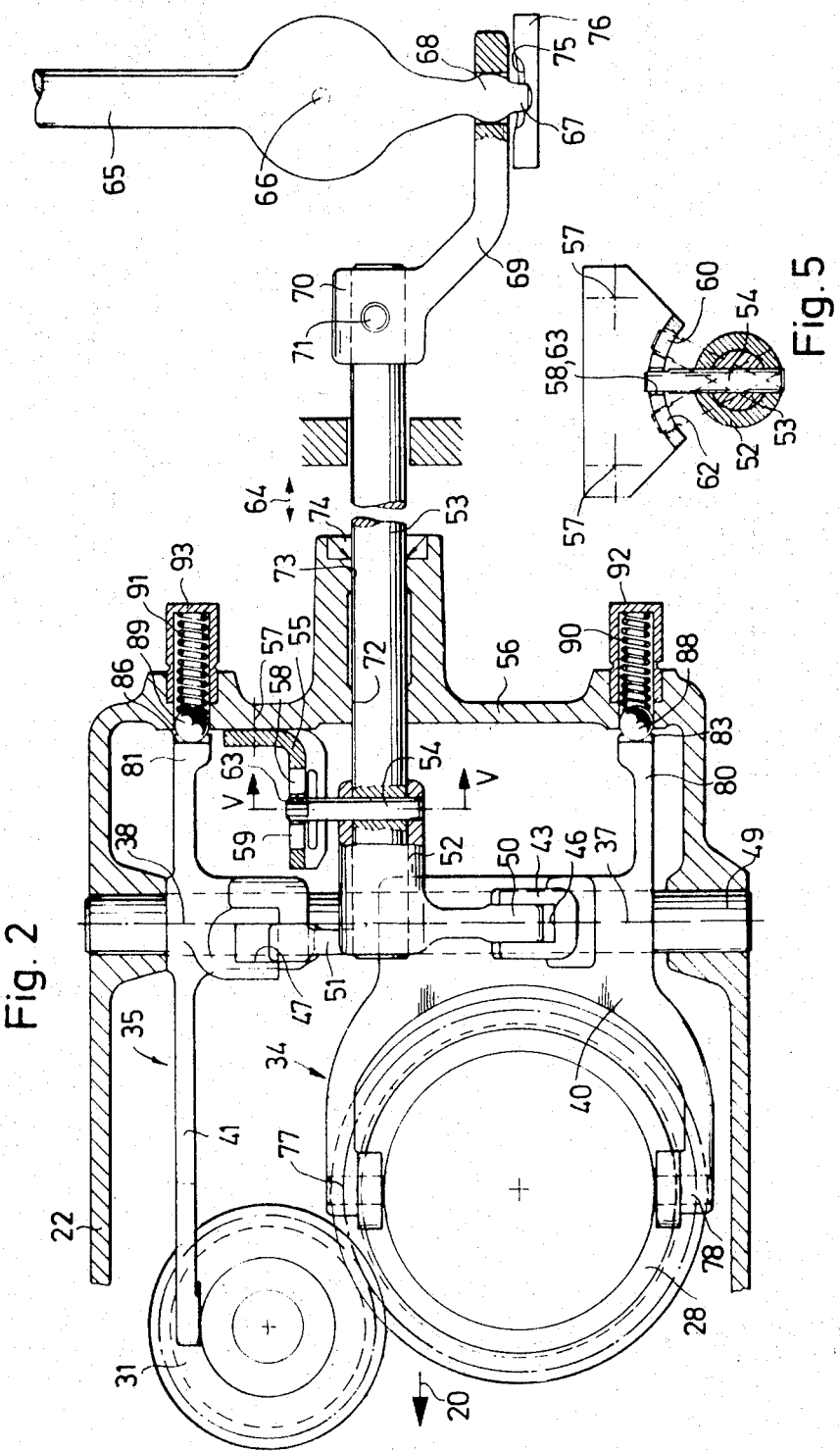
FIG. 2 is a fragmentary longitudinal vertical section through a gearshift arrangement that is shown generally in FIG. 1, looking towards a right-hand pivotal shift fork.
Figure 3:
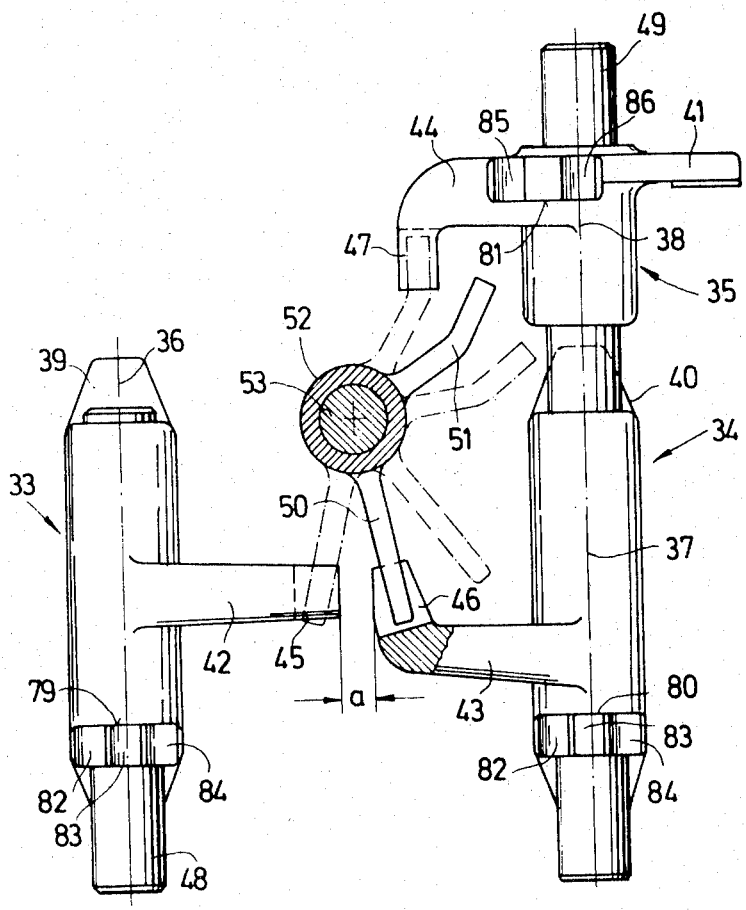
FIG. 3 is a view in a forward direction showing the main parts of the gearshift arrangement of FIGS. 1 and 2.
Figure 4:
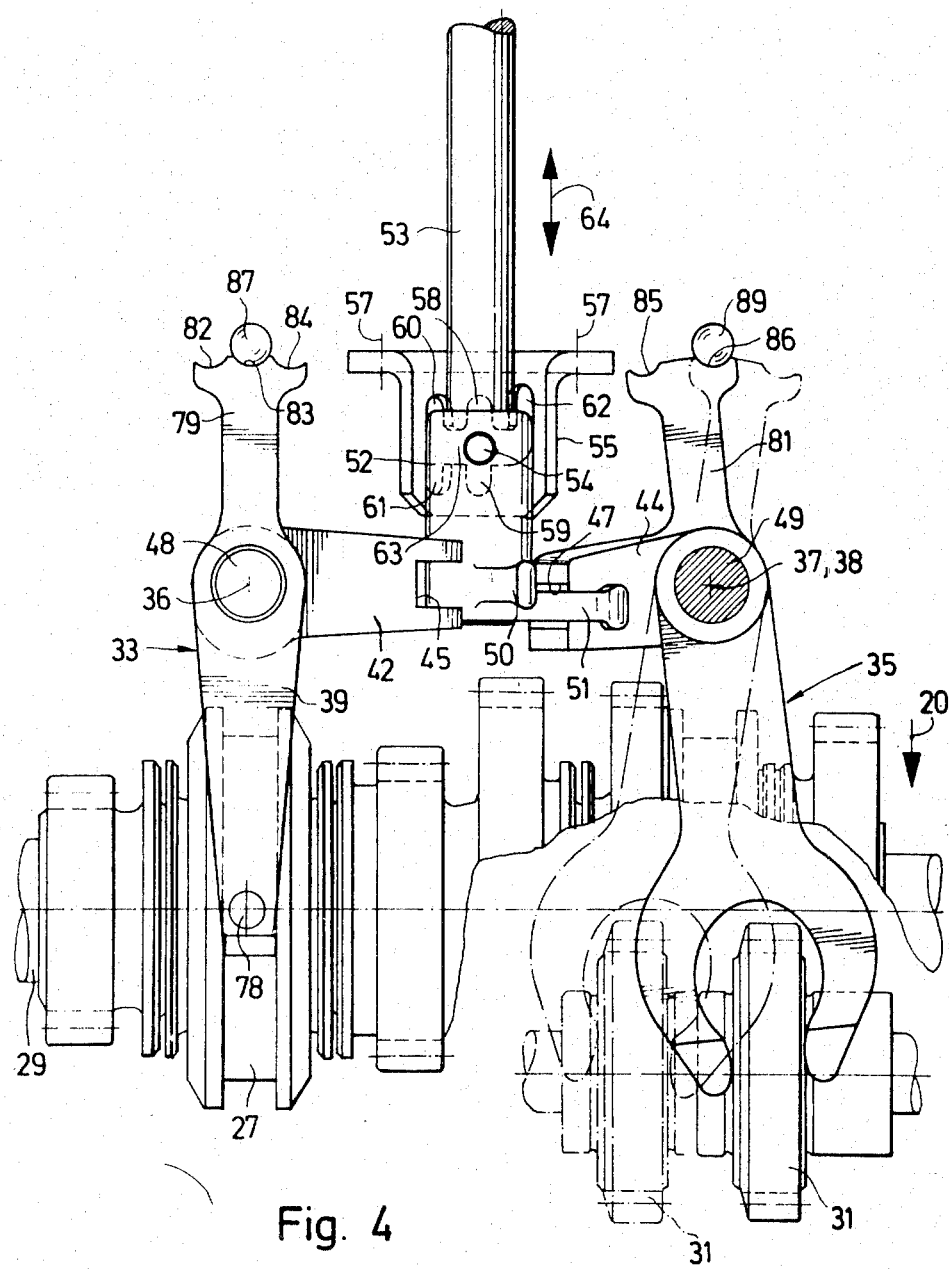
FIG. 4 is an underneath view of the gearshift arrangement of FIGS. 1 to 3, but with the pivotal shift fork for the first and second gear ratios omitted for clarity.

As will be seen particularly from FIGS. 2, 3 and 4, acutation of the shift coupling sleeves 27 and 28 or of the sliding pinion 31 is brought about by shift forks 33, 34 or 35 respectively, which are formed as angled pivotal shift forks, having an angle of 90° between first and second lever portions of each fork, and are mounted on pivot pins 48 and 49 respectively which are press-fitted into the housing of the gearbox 22 (FIG. 2). The pivot pin 49 forms a mounting for both the pivotal shift forks 34 and 35. The respective pivot axes are designated 36, 37 and 38.

A forwardly directed lever portion 39 or 40 or 41 (first lever portion) of each pivotal shift fork is bifurcated and straddles a shift coupling sleeve 27 or 28 or the sliding pinion 31, as the case may be, whereas a second lever portion 42 or 43 or 44 of each shift fork is arranged at right angles to the first lever portion of the respective shift fork and has a shift control groove 45, 46, 47 respectively at its free end. The control grooves 45 and 46 are arranged for selective co-operation with a selector finger 50, and the control groove 47 is arranged for selective co-operation with a separate selector finger 51. The selector fingers 50 and 51 extend from a common boss portion 52 formed by a hub fixed to a rotatable and axially displaceable selector shaft 53, and thus effectively form part of the shaft. A pin 54 extends through the boss portion 52 and shaft 53, and has an upwardly projecting end portion which co-operates with a gate 55 that is screwed (at position 57 shown in FIG. 2) on to a front wall 56 of the gearbox 22, above the selector shaft 53.

It is not strictly necessary to lock the non-actuated shift coupling sleeves 27 and 28 and sliding pinion 31, because the thickness of the selector fingers 50 and 51 is less than the distance (a in FIG. 3) between the shift control grooves 45 and 46 in the second lever portions 42 and 43, such that in an intermediate position of the selector fingers it is not possible to engage two pivotal shift forks simultaneously. However, to ensure that no shift movement at all can take place when the selector fingers 50 and 51 are in a position between the lever portions 42 and 43 of the pivotal shift forks 33 and 34, and further to prevent a selecting movement from occurring when a gear ratio is engaged, the gate 55 above the shaft 53 is provided with a recess for the pin 54, this recess corresponding to the shift movement. The recess of the gate 55 has five channels 58–62, namely a channel 58 for the first ratio, a channel 59 for the second, a channel 60 for the third, a channel 61 for the fourth and a channel 62 for the reverse ratio, as is best seen in FIG. 4, a cross-channel 63 being provided for selection of the required gear-ratio plane 58/59, or 60/61, or 62. In the shift position shown in FIGS. 1 and 4, the pin 54 is positioned within the selection cross-channel 63, in the gear-ratio plane 58/59. Therefore, in this position, by appropriate displacement of the shaft 53 in an axial direction (corresponding to the arrow 64), engagement of the first or second forward ratio is possible.

As will be seen particularly from FIGS. 1 and 2, the displacement movement of the shaft 53, and also its rotary movement required for the selection, is brought about in a manner known per se by means of a floor-mounted gearshift lever 65 having a universal mounting with a pivot center 66 in the vehicle body. As is shown in FIG. 2, the lower end 67 of the gearshift lever is peg-shaped, with a part-spherical head 68 forming a pivotal connection to a cranked lever 69 that is mounted by means of a hollow boss 70 and securing pin 71 in a rotationally fast manner on the rear end portion of the selector shaft 53. The main mounting for the rotatable and longitudinally displaceable selector shaft is the front wall 56 of the gearbox, at bearing surfaces 72 and 73, with a seal 74 to prevent the escape of oil from the gearbox.

The mode of operation of the shift arrangement is, in summary as follows:

Movement of the manual gearshift lever 65 in a direction transverse to the direction of vehicle travel imparts rotary movement to the selector shaft 53, such that one of the shift fingers 50 and 51 is aligned with or engages one of the shift control grooves 45–47 in the pivotal shift forks 33–35, thereby selecting the desired gear-ratio plane. Before the gear-ratio plane 62 for reverse can be selected, an additional blocking device has to be overcome, namely stop 76 (FIG. 2) which is provided with a longitudinal groove 75 and is located below the gearshift lever peg 67, such that this reverse blocker can be over-ridden by lifting the gearshift lever 65. Thereupon, following this selection of the desired gear-ratio plane, the manual gearshift lever 65 is moved in the direction of vehicle travel, to produce longitudinal displacement of the selector shaft 53 for engagement of the required gear ratio. By a direct, easy and substantially play-free action, the longitudinal movement of the selector shaft 53 is converted by the above-described right-angled pivotal shift forks 33–35 into transverse movement of the shift coupling sleeves 27, 28 or of the sliding pinion 31. As a matter of geometry, it will be observed that the ends of the pivotal shift forks 33 and 34 which engage the shift coupling sleeves execute a circular movement, whereas the movement of the shift coupling sleeves 27 and 28 must be rectilinear.

In order to prevent jump-out from the engaged ratios, or undesired ratio engagement from the neutral position, detent devices are provided for the individual shift positions. For this purpose, as best seen in FIGS. 2 and 4, the pivotal shift forks 33, 34, 35 are extended beyond their pivot axis, to form lever extensions 79, 80, 81 containing detent grooves 82, 83, 84 and 85, 86 in their respective hammer-shaped end portions. In the respective ratio positions, the detent grooves are engaged by spring-loaded detent balls 87, 88 and 89, the compression springs (such as 90 and 91) which spring-load these balls 87, 88, 89 being supported in sleeves (such as 92 and 93) which are secured in the front wall 56 of the gearbox 22.

I claim:

1. Gearshift arrangement for a motor vehicle change-speed gear, comprising a housing, a selector shaft movably mounted within said housing, a manually operable gearshift lever, means for converting movement of the gearshift lever in a first plane into rotary movement of the selector shaft and for converting movement of the gearshift lever in a second plane into longitudinal displacement of the selector shaft, selector means disposed within said housing and fixed to said selector shaft so as effectively to form a part thereof, and at least one angled pivotal shift fork disposed within said housing, said shift fork comprising a first lever portion which is bifurcated for co-operation with a respective gear coupling member, and said shift fork also comprising a second lever portion which is disposed at an angle to said first lever portion and includes a free lever end that is shaped and arranged to be engaged directly by said selector means during a gearshift.

2. Gearshift arrangement for a change-speed gear arranged in a motor vehicle in a direction at right angles to the direction of vehicle travel, comprising a selector shaft extending in the direction of vehicle travel, means forming a movable mounting for said selector shaft, means operable to produce selective rotary movement and longitudinal displacement of said selector shaft, selector means projecting in a generally radial direction from said selector shaft and movable therewith, first and second shift forks each comprising a first lever portion that is bifurcated for co-operation with a respective movable coupling member of said change-speed gear, each said shift fork also comprising, at right angles to said first lever portion, a second lever portion having a free end that is shaped and arranged to be engaged directly by said selector means during a gearshift, and spaced first and second vertically extending pivot pins forming pivot mountings for the respective shift forks at the junction of the first and second lever portions thereof, such that longitudinal displacement of said selector shaft causes a selected one of said selector forks to pivot about its pivot pin to thereby effect movement of the associated coupling member of said change-speed gear in a direction at right angles to the direction of vehicle travel.

3. Gearshift arrangement according to claim 2, in which said first and second lever portions of a shift fork as aforesaid are of substantially equal effective lengths.

4. Gearshift arrangement according to claim 2, in which said selector means projecting from said selector shaft comprises a finger that is arranged at one end of said shaft for selective co-operation with a groove formed in the free end of the second lever portion of each of said shift forks.

5. Gearshift arrangement for effecting selective movement of coupling members of a motor vehicle change-speed gear, comprising: a selector shaft extending in the direction of vehicle travel; means forming a movable mounting for said selector shaft; means operable to produce selective rotary movement and longitudinal displacement of said selector shaft; first and second selector fingers projecting in generally radial directions from an end portion of said selector shaft and movable therewith; first, second and third shift forks each comprising a first lever portion that is bifurcated for co-operation with a respective one of said coupling members, and also comprising, generally at right angles to said first lever portion, a second lever portion having a groove formed in the free end thereof; a first vertically extending pivot pin forming a pivot mounting for the first shift fork at the junction of the first and second lever portions thereof; a second vertically extending pivot pin spaced from said first pivot pin and forming a pivot mounting for both said second and said third shift forks at the junctions of the first and second lever portions of said shift forks; in an arrangement in which said first selector finger is selectively co-operable with said grooves in the free ends of the second lever portions of said first and second shift forks, and said second selector finger is selectively co-operable with the groove in the free end of the second lever portion of said third shift fork, such that rotary movement of said selector shaft brings one of said selector fingers into co-operating relationship with the groove in the free end of the second lever portion of a selected one of said shift forks, whereupon longitudinal displacement of said selector shaft causes said selected shift fork to pivot about its pivot pin to thereby effect movement of the associated coupling member of said change-speed gear in a direction transverse to the direction of vehicle travel.

6. Gearshift arrangement according to claim 5, in which said first selector finger has a width less than the distance between the free ends of the second lever portions of said first and second shift fork in the region of said grooves therein.

7. Gearshift arrangement according to claim 6, in which said shift forks are formed with respective lever extensions beyond their respective pivot pins, and spring-loaded detent balls are arranged for yieldable engagement in detend grooves in widened end portions of said lever extensions, for snap-in retention of said shift forks in position for the particular gear ratio engaged, said first and second shift forks additionally having an intermediate detent groove for establishing a neutral position.

8. Gearshift arrangement according to claim 7, in which a pin projects from said selector shaft into a fixedly mounted shift gate that is arranged to establish a gearshift pattern by means of a selector channel communicating with individual channels corresponding to the respective ratio positions, said pin co-operating with said channels to prevent a shift movement if the selector fingers are disposed between the grooves of two shift forks, and to prevent selection movement occurring if a gear ratio is engaged.

* * * * *